Aug. 11, 1964   E. W. MALMBERG   3,144,164
CLOSURE AND LATCH CONSTRUCTION
Filed March 26, 1963

INVENTOR.
EARL W. MALMBERG
BY George L. Church
ATTORNEY

United States Patent Office 3,144,164
Patented Aug. 11, 1964

3,144,164
CLOSURE AND LATCH CONSTRUCTION
Earl W. Malmberg, Wilmington, Del., assignor to Sun Oil Company, Philadelphia, Pa., a corporation of New Jersey
Filed Mar. 26, 1963, Ser. No. 268,205
9 Claims. (Cl. 220—55)

This invention relates to an improved closure and latch construction, and more particularly to such a construction for sealing an access opening in a receptacle.

Receptacles known as "glove boxes" are used for manipulating or working with certain materials which for various reasons must be exposed only to a controlled specified atmosphere. For example, in working with so-called "Ziegler" catalysts, all oxygen, water vapor, and carbon dioxide must be eliminated and kept out. For this purpose, a small positive pressure of a purified gas such as "pre-purified nitrogen" is maintained in the glove box at all times. To reduce the consumption of this gas and to maintain proper control of the atmosphere in the box, it is essential to have a tight seal at all the openings (such as the air locks or access openings) which are provided in the box.

In the past, for sealing, sterilizer-autoclave doors have sometimes been used; although tight seals can be obtained with these closures, doors of this type are costly and rather complicated in construction. Again, for sealing, six to twelve machine screws are sometimes used around the periphery of a door, to seal a gasket thereat; such a construction is of relatively low cost but is extremely inconvenient to use, since all of these screws must be entirely unscrewed in order to remove or open the door.

An object of this invention is to provide a novel closure and latch construction for receptacles.

Another object is to provide a closure and latch construction for glove boxes which is low-cost, convenient to use, and which gives a tight seal.

Occasionally, ordinary turn-latches have been used to seal closures; such latches are single-ended or non-symmetrical. The basic function of a latch, used with closures, is to compress a gasket between the wall of the receptacle and the door, thereby to effect a seal; the gasket which seals the opening around the screw (which is used to operate the latch) must also be compressed. In an ordinary turn-latch, the latching piece pivots, and holds against the wall of the receptacle. This results in the production of a torque on the pivot element (in this case the screw) of the latch, in a direction perpendicular to its axis. This torque is ultimately taken up by the sealing gasket of the pivot element, with the result that the pressure is exerted on only one side. Hence, the compression of the gasket (and thereby also the sealing) is realized on only one side, with very bad leaks on the other.

According to this invention, the aforementioned torque is eliminated by making the latching piece symmetrical (i.e., such that it has two oppositely-disposed wall-contacting portions), and by placing a "counter-wall" so that the pressure exerted on the receptacle wall (for effecting the seal) is countered by a pressure on an element exactly similar in structure. This "counter-pressure" construction makes it possible to obtain a uniform and adequate pressure on the gasket material at all points, and thus a tight seal. Moreover, with the construction of this invention closing and opening can be done conveniently; also, the mechanism is inexpensive to manufacture.

A detailed description of the invention follows, taken in conjunction with the accompanying drawings, wherein.

Figure 1:
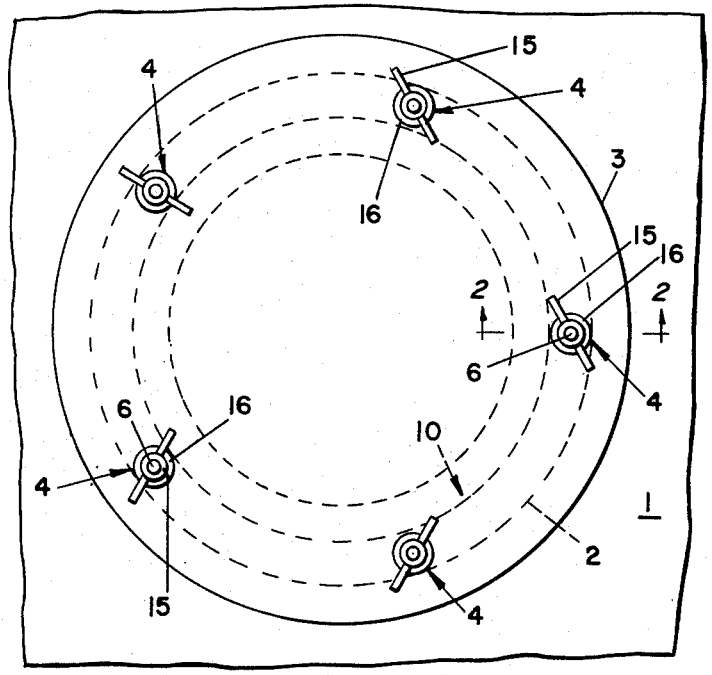
FIG. 1 is a front elevation of an access opening area of a receptacle utilizing the closure and latch construction of this invention, the closure utilizing five latches.

Referring first to FIG. 1, the numeral 1 indicates one wall of a receptacle such as a glove box. Receptacle wall 1 has a circular access opening 2 therein which is closed and sealed by means of an overlying circular closure member or door 3 which is removable to provide access to the interior of the receptacle. Although a circular opening and a circular closure are illustrated, this is purely by way of example; the invention is not at all limited to closures and openings of this shape, but is applicable generally to closures and openings of any configuration or shape. In FIG. 1, five similar latch assemblies, denoted generally by numeral 4, are distributed equiangularly around closure 3, near the radially outer edge thereof.

Figure 2:
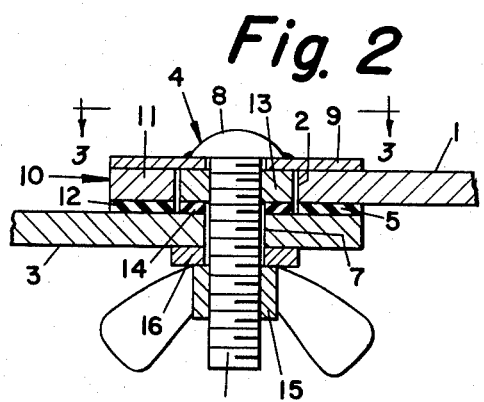
FIG. 2 is a cross-section through one of the latches, taken along line 2—2 of FIG. 1.

Refer now to FIG. 2. As illustrated in this figure, the closure 3 overlies the receptacle wall 1. That is to say, the diameter of this closure is greater than that of the opening 2, so the closure 3 has a portion which extends radially outwardly beyond opening 2, this portion overlying the receptacle wall 1. Moreover, since the closure member 3 is planar or disc-like, it may be said that the entire closure member overlies the receptacle wall. An annular or ring gasket 5, made of a rubber-like material having a certain amount of compressibility, it attached to closure 3 adjacent the radially outer edge thereof, and is adapted to be compressed against receptacle wall 1, to provide a seal between closure 3 and the receptacle wall. This gasket 5 is continuous, extends entirely around the opening 2, and is positioned between the closure member 3 and the receptacle wall 1, radially outwardly of access opening 2.

Each of the five latch assemblies 4 is based upon a respective machine screw 6; each machine screw passes through a respective hole 7 in closure member 3, the centers of the holes 7 being located radially inwardly from the outer edge of closure member 3 and also inwardly from the access opening 2 in receptacle wall 1. Only one of the latch assemblies 4 will be described in detail, since all five of these assemblies are exactly alike. At one end, the machine screw 6 has a head 8, and just under this head a latch member 9 is secured (as by cementing or soldering) to the screw head. Latch member 9 is symmetrical or two-lobed; that is to say, it has two oppositely-disposed wall-contacting portions, so that the latch is of generally elliptical shape, overall. The latch 9, of course, thas a central hole through which the shank of screw 6 passes. By rotating screw 6, the latch member 9 may be moved from a "closed" position (illustrated in FIG. 2, and also by solid lines in FIG. 3) to an "open" position (illustrated by dotted lines in FIG. 3). In the "closed" position, one of the two wall-contacting portions or lobes of latch 9 is adapted to engage that face of wall 1 which is opposite to the face thereof engaged by gasket 5.

A counter-wall assembly 10 is secured (cemented) to the inner face of closure 3, radially inwardly from screw 6 in a position such as to be engaged by the other of the two wall-contacting portions of latch 9, when the latter is in its "closed" position. The assembly 10 comprises a metallic ring or annulus 11 which has the same thickness as receptacle wall 1, and also an annular or ring gasket 12 which separates ring 11 from the closure member 3. Ring 11 may be termed a counter-pressure member. Gasket 12 is made of the same material as gasket 5, and has the same thickness and compressibility as gasket 5. Ring 11 and gasket 12 are continuous and are similar in outer configuration to the closure 3, although, of course, the inner and outer diameters of these two items are less than the diameter of closure 3. In the "closed" position of latch member 9, one of the two wall-contacting portions or lobes of the symmetrical latch member 9 is adapted to engage that face of ring 11 which is opposite to the face thereof covered by gasket 12. This is illustrated in FIG. 2, and also in solid lines in FIG. 3.

A tapped cylindrical metallic spacer 13 (which is tapped merely for convenience in assembling the same to screw 6, by threading it onto such screw) is secured to screw 6 (as by cementing or soldering), in engagement with that side of latch member 9 opposite screw head 8. Spacer 13 has an outer diameter such as to fit rather closely within the (annular) space between the edge 2 of receptacle wall 1 and the radially-outer edge of counter-wall assembly 10. Spacer 13 functions to hold the latch member 9 perpendicular to the axis of screw 6 as the latch is tightened. The length or thickness dimension of spacer 13 is identical with the thickness dimensions of wall 1 and counter-pressure member 11. An annular gasket 14, whose outer diameter is the same as that of spacer 13, is attached (as by cementing) to that face of spacer 13 opposite latch member 9, in alignment with gaskets 5 and 12. Gasket 14 is made of the same material as gaskets 5 and 12, and has the same thickness and compressibility as these latter gaskets. When the latch is tightened, gasket 14 is compressed against the inner face of closure member 3, to provide a seal at this closure member, around the screw 6.

In order to tighten the latch member 9 when the same is in its "closed" position, thereby to provide the desired seals around the screw 6 and around the closure member 3, a wing nut 15 (which may also be termed a thumb screw) is threaded onto the free, outer, or shank end of screw 6, a metallic washer 16 being interposed between this wing nut and that face of closure member 3 which is opposite to the face thereof engaged by gaskets 5, 12, and 14.

Figure 3:
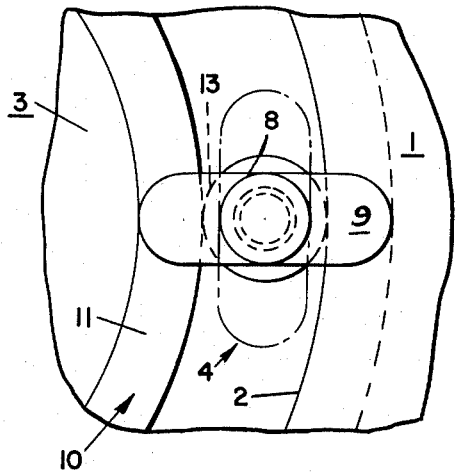
FIG. 3 is a face view of the latch from the inside of the receptacle, looking generally in the direction 3—3 of FIG. 2.

If latch member 9 is in the "closed" position shown in FIG. 2 and in solid lines in FIG. 3, wherein the two lobes of the latch engage, respectively, the receptacle wall 1 and the inner face of counter-wall assembly 10, then by tightening the wing nut 15 on screw 6 the seals are effected by compressing gasket 5 against receptacle wall 1 and by compressing gasket 14 against closure member 3. The inner faces of wall 1, spacer 13, and assembly 10 all lie in a common plane, and the gaskets 5, 12, and 14 all have the same thickness and compressibility. It is desired to be pointed out that by making the latch member 9 symmetrical and by placing the counter-wall assembly 10 so that the pressure exerted on wall 1 for the sealing is countered by a pressure on an element exactly similar in structure, there is no torque produced on the screw 6, in the direction perpendicular to its axis. The "counter-pressure" arrangement of the invention thus makes it possible to obtain a uniform and adequate pressure on the gaskets at all points, and thus a tight seal.

From a sealed position, the latch is operated by loosening the thumb screw (wing nut) 15 one to two turns, and then turning the screw 6 itself (and hence the latch 9, which is fixed to this screw) one-quarter turn. This brings the latch 9 to the dotted-line position of FIG. 3, wherein it no longer overlies the receptacle wall. Then, the entire latch assembly 4 is free to be removed as a unit, along with the closure or door 3 and with assembly 10, which latter is fastened to the door. The latch is closed by reversing the above procedure. Thus, it may be seen that closing and opening may be done very conveniently.

In general, it has been found that there is no difficulty in turning the screw 6 one-quarter turn. However, if necessary, a handle can be attached to the outer end of screw 6, to facilitate the turning thereof.

It will be appreciated that the elements of the single latch assembly described in detail will be duplicated for each of the latch assemblies 4 utilized. Thus, for a construction such as that of FIG. 1, which utilizes five latch assemblies, there would need to be five of each of the following elements: screw 6, hole 7, latch 9, spacer 13, gasket 14, wing nut 15, and washer 16. Of course, there is only a single counter-wall assembly 10.

The closure and latch construction of this invention is also applicable to doors closing flush, as well as to doors closing with an overlap as described above. Similarly, various modifications in the structural elements are possible for greater convenience or strength. For example, if the screw 6, latch 9, and spacer 13 are not cemented together as previously suggested, it is desirable to make them in one piece, so that no gas can leak out along the head 8 of the screw.

The invention claimed is:

1. For a receptacle having an access opening: a closure and latch construction for sealing said opening comprising a closure member covering said opening and having a portion overlying the wall of the receptacle adjacent said opening, a gasket positioned between the overlying portion of said closure member and the receptacle wall, a counterwall assembly secured to the inner face of said closure member and positioned inwardly of said closure member within said opening in spaced opposed relationship to said receptacle wall, the outer configuration of that portion of said assembly facing said wall matching the configuration of said opening and said assembly having a thickness equal to that of said wall plus that of said gasket, whereby the inner face of said assembly and the inner surface of said wall adjacent said opening lie in a common plane; an elongated member passing through an opening in said closure member and through the space between said wall and said assembly, a latch member secured to said elongated member and having two oppositely-disposed wall-contacting portions for engaging respectively the inner face of said assembly and the inner surface of said wall adjacent said opening, and means associated with said elongated member for bringing said latch member into tight engagement with said assembly and said wall.

2. A closure and latch construction according to claim 1, wherein the counter-wall assembly comprises a counter-pressure member having a thickness equal to that of said wall, and a gasket having a thickness and compressibility equal to that of the first-mentioned gasket.

3. A closure and latch construction as defined in claim 1, utilizing a plurality of similar elongated members each passing through a respective opening in said closure member, a plurality of similar latch members each secured to a respective one of said elongated members, and a plurality of similar means, one associated with each of said elongated members, for bringing its respective latch member into tight engagement with said assembly and said wall.

4. A closure and latch construction in accordance with claim 1, including also a spacer secured to said elongated member and positioned within the space between said wall and said assembly, the length of said spacer being equal to the thickness of said wall and the inner end of said spacer lying in the common plane of the inner face of said assembly and the inner surface of said wall adjacent said opening.

5. A closure and latch construction in accordance with claim 4, including also an annular gasket secured to the outer end of said spacer and engaging the inner face of said closure member, said annular gasket having a thickness and compressibility equal to that of the first-mentioned gasket.

6. A closure and latch construction in accordance with claim 1, wherein the elongated member is a screw, and wherein said means comprises a nut threaded on said screw and bearing against the outer face of said closure member; said construction including also a spacer secured to said screw and positioned within the space between said wall and said assembly, the length of said spacer being equal to the thickness of said wall and the inner end of said spacer lying in the common plane of the inner face of said assembly and the inner surface of sai dwall adjacent said opening.

7. A closure and latch construction in accordance with claim 6, including also an annular gasket secured to the outer end of said spacer and engaging the inner face of said closure member, said annular gasket having a thickness and compressibility equal to that of the first-mentioned gasket.

8. A closure and latch construction in accordance with claim 1, wherein the counter-wall assembly comprises a counter-pressure member having a thickness equal to that of said wall, and a gasket having a thickness and compressibility equal to that of the first-mentioned gasket; said construction including also a spacer secured to said elongated member and positioned within the space between said wall and said assembly, the length of said spacer being equal to the thickness of said wall and the inner end of said spacer lying in the common plane of the inner face of said assembly and the inner surface of said wall adjacent said opening.

9. A closure and latch construction in accordance with claim 8, including also an annular gasket secured to the outer end of said spacer and engaging the inner face of said closure member, said annular gasket having a thickness and compressibility equal to that of the gasket which is positioned between the closure member and the receptacle wall.

References Cited in the file of this patent
UNITED STATES PATENTS

| | | |
|---|---|---|
| 2,084,541 | Tornblom | June 22, 1937 |
| 2,334,012 | Koch et al. | Nov. 9, 1943 |
| 2,915,152 | Graham | Dec. 1, 1959 |